(12) United States Patent
Kobayashi et al.

(10) Patent No.: US 7,239,454 B2
(45) Date of Patent: *Jul. 3, 2007

(54) IMAGE DISPLAY APPARATUS

(75) Inventors: Manabu Kobayashi, Saitama (JP);
Tetsuji Suzuki, Yokosuka (JP);
Takatsugu Aizaki, Yokosuka (JP);
Ryusaku Takahashi, Yokosuka (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/477,900

(22) Filed: Jun. 30, 2006

(65) Prior Publication Data

US 2007/0002466 A1    Jan. 4, 2007

Related U.S. Application Data

(63) Continuation of application No. 11/010,576, filed on Dec. 14, 2004, now Pat. No. 7,095,568.

(30) Foreign Application Priority Data

Dec. 19, 2003    (JP)    ............................ P2003-422945

(51) Int. Cl.
*G02B 26/00* (2006.01)
*G02F 1/01* (2006.01)

(52) U.S. Cl. ...................... 359/740; 359/238; 359/291; 355/71

(58) Field of Classification Search ................. 359/739
See application file for complete search history.

(56) References Cited

U.S. PATENT DOCUMENTS

| 7,095,568 B2 * | 8/2006 | Kobayashi et al. ......... 359/740 |
| 2005/0036216 A1 | 2/2005 | Lee ............................. 359/738 |

FOREIGN PATENT DOCUMENTS

| JP | 05-303085 | 11/1993 |
| JP | 09-274253 | 10/1997 |
| JP | 11-281923 | 10/1999 |

* cited by examiner

*Primary Examiner*—Scott J. Sugarman
*Assistant Examiner*—Darryl J. Collins
(74) *Attorney, Agent, or Firm*—The Nath Law Group; Jerald L. Meyer; Stanley N. Protigal

(57) ABSTRACT

An image display apparatus includes a diaphragm (9b) arranged at a pupil position. The shape of an aperture of the diaphragm (9b) is similar to the shape of a light source image formed by an illuminating optical system at the pupil position. An area varying mechanism (90) varies the area of the aperture of the diaphragm (9b) in response to a focal length varying operation of a projection lens (9). This prevents an excessive opening from being formed around a light source image cast by the illuminating optical system, thereby preventing the deterioration of displayed images due to unwanted light that may pass through the excessive opening.

4 Claims, 9 Drawing Sheets

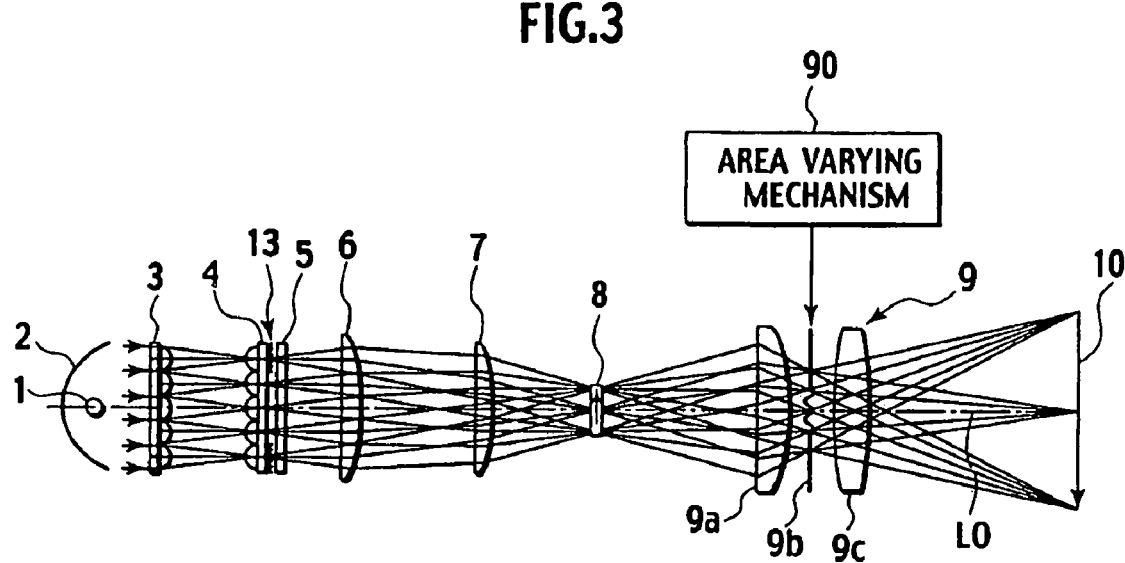
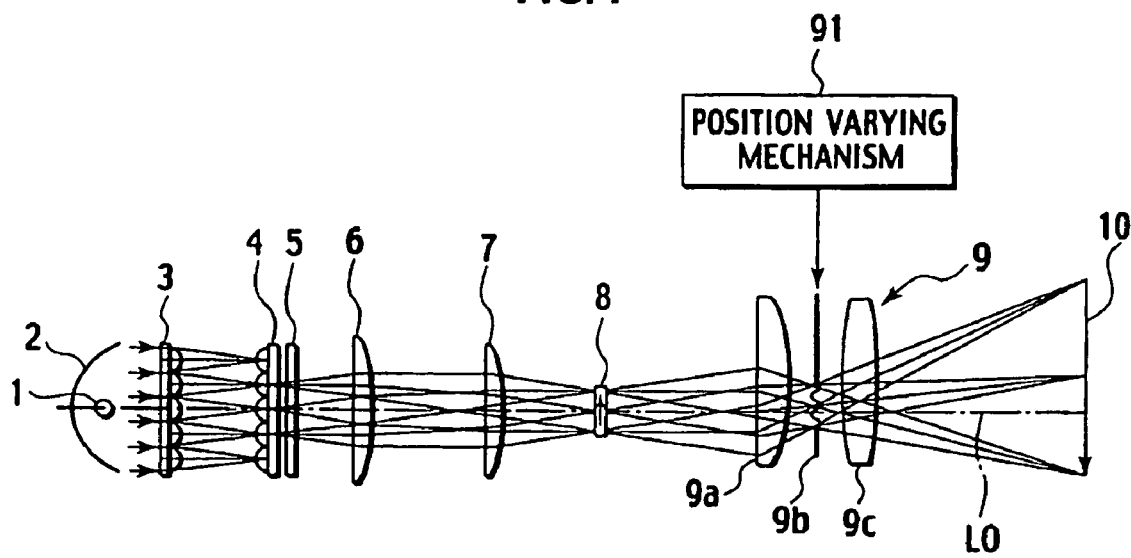

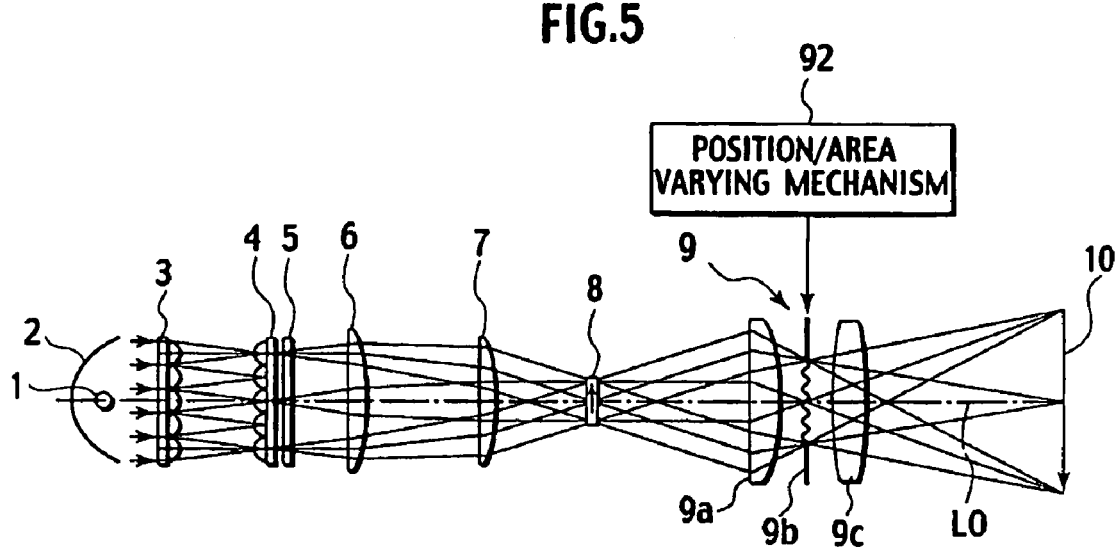
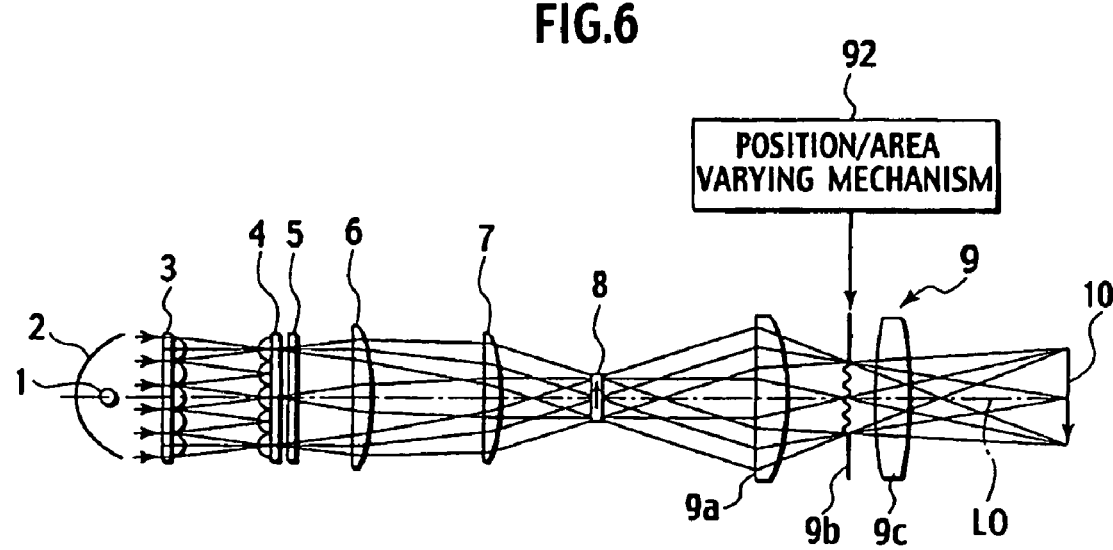

IMAGE DISPLAY APPARATUS

This application is a continuation patent application of Ser. No. 11/010,576, filed Dec. 14, 2004 now U.S. Pat. No. 7,095,568 the entire content of which is hereby incorporated by reference in its entirety.

FIELD OF THE INVENTION

The present invention relates to an image display apparatus that modulates light flux with a spatial light modulator such as a liquid crystal display element or a liquid crystal light valve and projects the modulated light flux onto a screen.

BACKGROUND OF THE INVENTION

Front-projection-type image display apparatuses are gradually spreading due to widespread personal computers and digital television broadcasting.

A typical example of the front-projection-type image display apparatus is a three-panel color projector employing three spatial light modulators made of, for example, liquid crystal display elements. The three-panel color projector employs a strong light source such as a metal halide lamp to emit a white beam. The white beam is separated into three primary-color beams, which are guided to the spatial light modulators, respectively. The spatial light modulators modulate the three primary-color beams according to image signals. The modulated beams are combined into a combined beam, which is projected from a projection lens to form an image on a screen.

The image display apparatus of this type has an illuminating optical system that guides a beam from the light source and illuminates the spatial light modulators with the beam. The illuminating optical system must efficiently and uniformly illuminate the spatial light modulators with a beam of finite size emitted from the light source.

An example of the illuminating optical system is an integrator optical system. Examples of the integrator optical system include a fly-eye lens array optical system and a rod integrator optical system.

The fly-eye lens array optical system employs a fly-eye lens array that consists of a plurality of small-diameter lenses arranged in a fly-eye configuration (two-dimensional configuration), the shape of each lens being similar to the shape of an illuminated area. The fly-eye lens array receives light flux and divides the light flux into beams lens by lens. The beams are combined together to provide an efficient uniform illumination beam. This beam forms a light source image at the pupil of a projection lens.

The rod integrator optical system employs a rod integrator having an entrance face and an exit face. The shape of each of the entrance and exit faces is similar to the shape of an illuminated area. Light flux from a light source is condensed and is efficiently made incident to the entrance face of the rod integrator. The incident light flux is reflected multiple times in the rod integrator and is emitted from the exit face of the rod integrator. The emitted beam from the rod integrator is uniform over the exit face of the rod integrator and is focused under a given magnification on an illuminated area (spatial light modulator) to thereby illuminate the illuminated area efficiently and uniformly. The rod integrator optical system forms a plurality of light source images, whose number is equal to the number of reflections in the glass rod, at the pupil of a projection lens, the shape of each light source image corresponding to the shape of an opening of the glass rod.

In this way, the flay-eye lens array optical system and rod integrator optical system form each a light source image at the pupil of a projection lens.

The projection lens of the front-projection-type image display apparatus, in particular, that of the three-panel color projector must have a sufficiently long back focus and a telecentric characteristic to allow a color combining unit such as a prism to be installed on the light source side of the projection lens.

The projection lens may be a zoom lens having a variable focal length. To make the zoom projection lens compact, the lens must be configured such that a pupil position is variable according to a focal length varying operation (zooming operation). Varying the focal length of the zoom projection lens with the size of an aperture (diaphragm) of the lens being fixed results in varying the F-number of the lens.

According to the image display apparatus mentioned above, the shape of the opening of the projection lens is circular. In the illuminating optical systems mentioned above, the shape of a light source image formed at the pupil of a projection lens is not always circular. For example, the fly-eye lens array optical system forms a rectangular integrator image at the pupil of a projection lens, and the rod integrator optical system forms a rectangular rod opening image at the pupil of a projection lens.

Accordingly, the projection lens having a circular opening will have extra open sections around the light source image, to pass unwanted light through the extra open sections to deteriorate the quality of displayed images.

To avoid this problem, some related arts (Japanese Patent Application Laid-open Nos. 5-303085 and 9-274253) arrange a rectangular diaphragm in the vicinity of a projection lens and another related art (Japanese Patent Application Laid-open No. 11-281923) arranges a light shield having a rectangular aperture in the vicinity of a fly-eye lens array that is arranged on the light source side of a spatial light modulator. With these arrangements, the related arts provide a rectangular image from a projection lens.

SUMMARY OF THE INVENTION

For an image display apparatus having a focal-length-variable projection lens, it is not acceptable to simply arrange a diaphragm having an aperture whose shape is similar to the shape (for example, rectangle) of a condensed beam emitted from a fly-eye lens array optical system or from a rod integrator optical system. This is because, when the focal length of the projection lens is changed, the diaphragm will pass excessive light (unwanted light) to deteriorate the quality of displayed images, or the diaphragm will block necessary light to deteriorate the light use efficiency. It is necessary for the image display apparatus having a focal-length-variable projection lens to properly control the aperture of a diaphragm when the aperture has a shape similar to the shape of a condensed beam provided by an illuminating optical system.

As mentioned above, the F-number of an illuminating optical system of an image display apparatus is unchanged without regard to the size of an image projected from a projection lens. Accordingly, in the image display apparatus having a focal-length-variable projection lens with an illuminating optical system having an F-number of, for example, F2.8, a focal length varying operation from a short focus end to a long focus end may change the F-number of the projection lens from F2.2 to F2.8, for example. In this case, the projection lens at the short focus end is in an excessively opened state (small F-number). In this case, unnecessary light passes through the excessive opening to deteriorate the quality of displayed images. In another case, the focal length varying operation from the short focus end to the long focus end may change the F-number of the projection lens from F2.8 to F3.4, for example. Then, the aperture of the projection lens at the long focus end is small (large F-number), and light from the illuminating optical system is insufficiently used to deteriorate the light use efficiency.

Some image display apparatus employs a flapping function that offsets the optical axis of a projection lens from the optical axis of a spatial light modulator or of a color separating/combining optical system. The image display apparatus of this type projects only part of a beam emitted from the projection lens onto a screen. For this type of image display apparatus, it is critical to properly control a diaphragm in response to a focal length varying operation of the projection lens.

Some image display apparatus employs a wavelength selective filter to adjust a color balance. For this type of image display apparatus, it is important to always maintain a proper color balance without regard to a focal length varying operation of a projection lens.

The present invention was made to solve the above-mentioned problems and satisfy the above-mentioned requirements. An object of the present invention is to provide an image display apparatus having a focal-length-variable projection lens, capable of always displaying optimum images regardless of a focal length varying operation of the projection lens.

Another object of the present invention is to provide an image display apparatus having a focal-length-variable projection lens whose optical axis is offset, capable of always displaying optimum images regardless of a focal length varying operation of the projection lens.

Still another object of the present invention is to provide an image display apparatus having a focal-length-variable projection lens and a color balance adjusting filter, capable of always displaying optimum images regardless of a focal length varying operation of the projection lens.

In order to accomplish the objects, an aspect of the present invention provides an image displays apparatus having a focal-length-variable projection lens (9). The apparatus includes a light source (1) configured to emit light flux, an illuminating optical system (3, 4, 11) configured to condense the light flux from the light source into light flux having a predetermined shape, a spatial light modulator (8) configured to modulate the condensed light flux, a diaphragm (9b) having an aperture whose shape is similar to the predetermined shape, and an area varying mechanism (90) configured to vary the area of the aperture of the diaphragm in response to a focal length varying operation of the projection lens.

Another aspect of the present invention provides an image display apparatus having a focal-length-variable projection lens (9). The apparatus includes a light source (1) configured to emit light flux, an illuminating optical system (3, 4, 11) configured to condense the light flux from the light source into light flux having a predetermined shape, a spatial light modulator (8) configured to modulate the condensed light flux, a diaphragm (9b) having an aperture whose shape is similar to the predetermined shape, and a first position varying mechanism (92) configured to vary the position of the diaphragm in an optical axis direction in response to a focal length varying operation of the projection lens.

The projection lens may be offset from an optical axis. In this case, the image display apparatus may further include a second position varying mechanism (91) configured to vary the position of the aperture of the diaphragm relative to the optical axis.

Still another aspect of the present invention provides an image display apparatus having a focal-length-variable projection lens (500). The apparatus includes a light source (21) configured to emit light flux, an illuminating optical system (23, 24) configured to condense the light flux from the light source into light flux having a predetermined shape, a color separating optical system (300) configured to separate the condensed light flux into a plurality of color beams, spatial light modulators (28R, 28G, 28B) arranged for the plurality of color beams, respectively, each configured to modulate the corresponding color beam, a color combining optical system (300) configured to combine the modulated color beams from the spatial light modulators into a combined beam and supply the combined beam to the projection lens, a color balance adjusting filter (241) configured to adjust a color balance of the combined beam, a diaphragm (53) having an aperture whose shape is similar to the predetermined shape, and a first position varying mechanism (63) configured to vary the position of the diaphragm in an optical axis direction in response to a focal length varying operation of the projection lens.

The image display apparatus may further include an area varying mechanism (63) configured to vary the area of the aperture of the diaphragm in response to the focal length varying operation of the projection lens.

The projection lens may be offset from an optical axis. In this case, the image display apparatus may further include a second position varying mechanism (63) configured to vary the position of the aperture of the diaphragm relative to the optical axis in response to the focal length varying operation of the projection lens.

The projection lens may consist of a plurality of lenses, and the diaphragm may be arranged between two of the plurality of lenses.

The illuminating optical system may include a fly-eye lens, and the color balance adjusting filter may be deposited on the fly-eye lens.

The image display apparatus according to the present invention can vary the focal length of the projection lens without passing unwanted light and without blocking necessary light, and therefore, can display images of high contrast without deteriorating the light use efficiency.

The image display apparatus according to the present invention can realize a flapping function by offsetting the projection lens from an optical axis. In connection with this function, the image display apparatus can always optimally control the position of the aperture of the diaphragm in a flapping direction when conducting a focal length varying operation. With the focal length varying operation, the image display apparatus can maintain an optimum color balance adjusted by the color balance adjusting filter.

BRIEF DESCRIPTION OF THE DRAWINGS

FIG. 3 is a plan view showing an image display apparatus according to a first embodiment of the present invention;

FIG. 4 is a plan view showing an image display apparatus according to a second embodiment of the present invention;

FIG. 5 is a plan view showing an image display apparatus according to a third embodiment of the present invention with a projection lens being at a short focus end;

FIG. 6 is a plan view showing the image display apparatus according to the third embodiment with the projection lens being at a long focus end;

DETAILED DESCRIPTION OF THE INVENTION

Image display apparatuses according to embodiments of the present invention will be explained in detail with reference to the accompanying drawings.

First, basic configurations for the image display apparatuses of the embodiments will be explained.

First Basic Configuration

Figure 1:
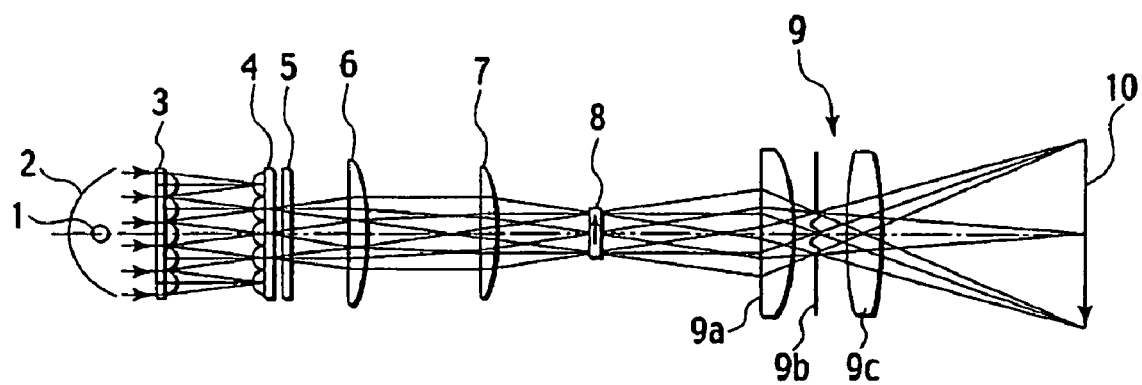
FIG. 1 is a plan view showing a first basic configuration for an image display apparatus according to the present invention.

FIG. 1 is a plan view showing a first basic configuration for an image display apparatus according to the present invention.

For the sake of simplicity, the basic configuration of FIG. 1 relates to a monochromatic image display apparatus in which a light source 1 emits light that illuminates a single liquid crystal light valve (hereinafter referred to as LC light valve) 8 serving as a spatial light modulator. FIG. 1 explains only a principle of the present invention. In the case of a color image display apparatus that needs adjusting a color balance (white balance), it is necessary to add a color separating optical system and a color combining optical system to separate light into red (R), green (G), and blue (B) beams and combine them together.

The first basic configuration of FIG. 1 employs a fly-eye lens array optical system.

In FIG. 1, the light source 1 emits light, and a reflector 2 reflect the light in the direction of an optical axis LO. The light source 1 may be a high-voltage mercury lamp or a metal halide lamp to emit white light. The reflector 2 has a reflective face of a paraboloid of revolution or of an ellipsoid of revolution around the optical axis LO, to reflect light from the light source 1 and provide light flux traveling parallel to the optical axis LO.

The image display apparatus based on the first basic configuration also includes a first lens array (fly-eye lens) 3, a second lens array (fly-eye lens) 4, a PS combiner 5, a superposing lens 6, a condenser lens 7, and an LC light valve 8. The superposing lens and condenser lens are called field lenses.

Each of the first and second lens arrays 3 and 4 consists of a plurality of lens cells that are two-dimensionally arranged to spatially divide a light emission opening of the reflector 2 into small sections. Each of the lens cells has a shape similar to the shape (rectangular) of the LC light valve 8.

The lens cells of the first lens array 3 correspond to those of the second lens array 4, respectively, and condense the light from the reflector 2 to the lens cells of the second lens array 4, so that secondary light source images are formed on the second lens array 4. The number of the secondary light source images is the same as the number of the lens cells of the first lens array 3. Each of the lens cells of the second lens array 4 forms the image of an opening of the corresponding lens cell of the first lens array 3 on the LC light valve 8.

The PS combiner 5 aligns incident light to an s-polarized beam or a p-polarized beam, to thereby improve the light use efficiency of a polarizing optical system (including a color separating optical system and a color combining optical system not shown in FIG. 1) in a subsequent stage.

The superposing lens 6 adjusts the center of each lens cell image to the center of the LC light valve 8, so that the images of the lens cells of the first lens array 3 are superposed on the LC light valve 8.

The condenser lens 7 condenses light flux so that a modulated beam from the LC light valve 8 may travel in the direction of an entrance pupil of a projection lens 9.

The LC light valve 8 has an LC panel containing a plurality of liquid crystal cells arranged two-dimensionally and an analyzer (polarizing plate) to transmit only light polarized in a given direction. The LC light valve 8 controls the amount of transmission light cell by cell and provides a modulated beam.

The modulated beam from the LC light valve 8 is made incident to an entrance lens 9a of the projection lens 9, is passed through a pupil position, and is emitted from an exit lens 9c of the projection lens 9. At the pupil position of the projection lens 9, a diaphragm 9b is arranged. In FIGS. 1 to 6, a wavy mark in the diaphragm 9b represents the pupil of the projection lens 9. The modulated beam emitted from the projection lens 9 forms an image of the LC light valve 8 on a screen 10, thereby displaying an image.

According to the first basic configuration, the projection lens 9 is of a two-group, two-piece structure including the two convex lenses. The projection lens 9 is not limited to this structure. It may involve more lenses, or may consist of focal-length-variable lenses as will be explained in connection with other embodiments.

In the projection lens 9, an integrator image or a light source image is formed at the pupil position of the diaphragm 9b. The shape of the light source image is equal to the shape of an opening of the second lens array 4. If the shape of the opening of the second lens array 4 is rectangular, the shape of the light source image is also rectangular.

In the projection lens 9, the shape of the aperture of the diaphragm 9b is similar to the shape of the light source image formed at the pupil position of the projection lens 9. Namely, the shape of the aperture of the diaphragm 9b of the projection lens 9 is rectangular if the shape of the opening of the second lens array 4 is rectangular.

The illuminating optical system from the light source 1 to the condenser lens 7 prevents an excessive opening from being formed around the light source image formed at the pupil position of the projection lens 9. There will be no unwanted light passing through the projection lens 9 to deteriorate the quality of images displayed on the screen 10.

Second Basic Configuration

Figure 2:
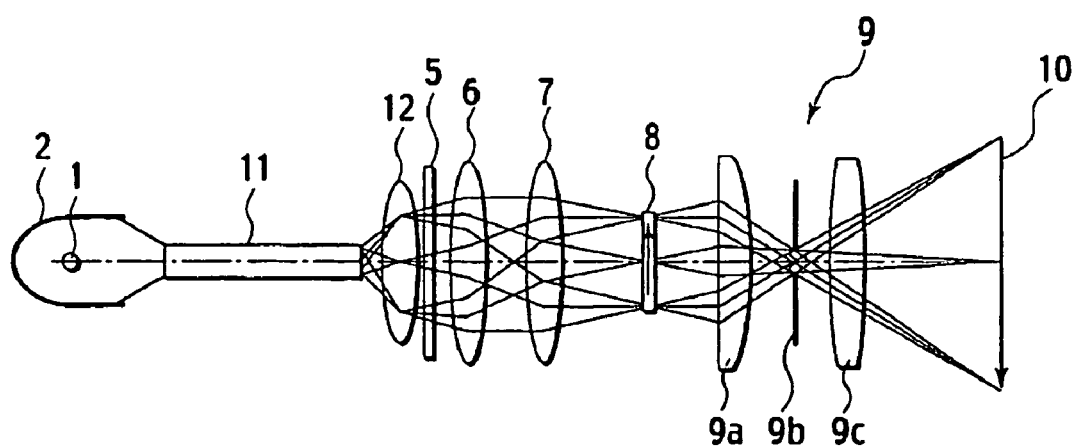
FIG. 2 is a plan view showing a second basic configuration for an image display apparatus according to the present invention.

FIG. 2 is a plan view showing a second basic configuration for an image display apparatus according to the present invention. This configuration employs a rod integrator optical system.

In FIG. 2, a light source 1 emits illumination light, which is reflected by a reflector 2 and is condensed and made incident to an entrance face of a rod 11.

The rod 11 is columnar and is made of transparent material such as glass. The rod 11 has a rectangular cross-sectional shape similar to the shape (rectangular) of a display face of an LC light valve 8. The rod 11 totally reflects the incident light several times by an inner face thereof. The light repeatedly reflected in the rod 11 is emitted from an exit face of the rod 11. The light emitted from the rod 11 is transmitted through an exit lens 12 and a PS combiner 5 and is made incident to a superposing lens 6.

The light transmitted through the superposing lens 6 is transmitted through a condenser lens 7 and illuminates the LC light valve 8, which modulates the incident light.

The modulated light from the LC light valve 8 is made incident to a projection lens 9, which emits light to form an image of the LC light valve 8 on a screen 10.

The illuminating optical system of this image display apparatus forms a plurality of light source images on the emission face of the rod 11 and also on the superposing lens 6. The number of the light source images corresponds to the number of total-reflections of light in the rod 11. These light source images are superposed at a pupil position of the projection lens 9. The shape of each light source image is equal to the shape of the emission face of the rod 11, which is similar to the shape of a display face of the LC light valve 8, which is, for example, rectangular.

The shape of an aperture of a diaphragm 9b in the projection lens 9 is similar to the shape of the light source image formed at the pupil position of the projection lens 9. Namely, the shape of the aperture of the diaphragm 9b of the projection lens 9 is similar to the shape (for example, rectangular) of the emission face of the rod 11.

The illuminating optical system from the light source 1 to the condenser lens 7 prevents an excessive opening from being formed around the light source image formed at the pupil position of the projection lens 9. There will be no unwanted light passing through the projection lens 9 to deteriorate the quality of images displayed on the screen 10.

Now, image display apparatuses according to embodiments of the present invention will be explained.

First Embodiment

FIG. 3 is a plan view showing an image display apparatus according to a first embodiment of the present invention. In FIG. 3 the same parts as those of FIG. 1 are represented with like reference numerals and their explanations will not be repeated. A projection lens 9 shown in FIG. 3 is of a focal-length-variable type.

For the sake of simplicity, the image display apparatus of FIG. 3 is depicted as a monochromatic image display apparatus. In practice, the apparatus will be materialized as a color image display apparatus. Illumination light from a light source 1 is transmitted through first and second lens arrays 3 and 4. Part of the transmitted light distal from an optical axis L0 is passed through a color balance adjusting filter 13. The filter 13 blocks a predetermined wavelength range of the light to drop the level thereof and passes the remaining wavelength range of the light, to thereby adjust a color balance of images to be displayed. In this example, the filter 13 is formed on the PS combiner 5 side of the second lens array 4. Instead, the filter 13 may be formed on the light source 1 side of the first lens array 3, between the first and second lens arrays 3 and 4, between the second lens array 4 and a superposing lens 6, or the like. The filter 13 blocks a given wavelength range of light passing through the filter 13, to thereby drop the level of the light in the given wavelength range when displaying images. The filter 13 is designed to block a given wavelength range of light traveling along a path distal from the optical axis L0. This is equal to reducing the diameter of light flux in the blocked wavelength range and to increasing the F-number of the illuminating optical system in connection with the light in the blocked wavelength range.

The first embodiment of FIG. 3 employs an area varying mechanism 90 to vary the area of an aperture of a diaphragm 9b in response to a focal length varying operation of the projection lens 9. Namely, the area of the aperture of the diaphragm 9b is variable. A proper known structure may be adopted for the mechanism 90 to change the aperture area of the diaphragm 9b. With the diaphragm 9b of variable aperture, the image display apparatus can fully utilize the color balance adjusting function of the filter 13.

Namely, light that travels along a path distal (peripheral) from the optical axis of the illuminating optical system is blocked (or attenuated) by the filter 13 in a given wavelength range. At a pupil position of the projection lens 9, the attenuated light passes the periphery (distal from an optical axis) of the aperture of the diaphragm 9b.

If the aperture of the diaphragm 9b is sufficiently wide, the light transmitted through the filter 13 and the light (proximal to the optical axis) not transmitted through the filter 13 both pass through the aperture of the diaphragm 9b. In this case, the light passing through the diaphragm 9b and reaching the screen 10 is color-balance-adjusted light partly transmitted through the filter 13.

When the aperture of the diaphragm 9b is narrowed, the periphery of the light transmitted through the filter 13 is blocked by the diaphragm 9b, to reduce the ratio of the light transmitted through the filter 13 and reaching the screen 10. When the aperture of the diaphragm 9b is further narrowed, the light transmitted through the filter 13 is entirely blocked by the diaphragm 9b, and therefore, light flux passing through the diaphragm 9b and reaching the screen 10 is only light flux whose color balance has not been adjusted by the filter 13.

In this way, adjusting the size of the aperture of the diaphragm 9b results in adjusting the ratio of light transmitted through the filter 13 and reaching the screen 10. Namely, adjusting the size of the aperture of the diaphragm 9b results in adjusting the degree of color balance adjustment effected by the filter 13. This configuration, therefore, is effective to finely adjust the color balance of images to display.

Although the first embodiment and embodiments that follow are based on the first basic configuration employing a fly-eye lens array optical system, the embodiments can be based on the second basic configuration employing a rod integrator optical system.

Second Embodiment

FIG. 4 is a plan view showing an image display apparatus according to a second embodiment of the present invention. In FIG. 4, the same parts as those of FIG. 1 are represented with like reference numerals and their explanations will not be repeated. A projection lens 9 shown in FIG. 4 is of a focal-length-variable type.

The image display apparatus according to the second embodiment has a flapping function. Namely, the optical axis (center axis) of the projection lens 9 is offset in parallel from the optical axis L0 of an illuminating optical system, or is inclined relative to the optical axis L0. The flapping function is useful to correctly display an image on a screen 10 when the image display apparatus is offset from a front position of the screen 10, or when the image display apparatus is inclined relative to a normal of the screen 10.

In FIG. 4, the optical axis of the projection lens 9 is offset in parallel from the optical axis L0 of the illuminating optical system. The illuminating optical system emits light to illuminate an LC light valve 8, which provides a modulated beam. The modulated beam is made incident to the projection lens 9 in which the modulated beam travels along an optical path that is offset from the optical axis of the projection lens 9 and reaches the screen 10.

According to the second embodiment, a diaphragm 9b of the projection lens 9 is arranged so that an aperture of the diaphragm 9b can be offset from the optical axis of the projection lens 9. Namely, the diaphragm 9b of the projection lens 9 is provided with a position varying mechanism 91 to vary the position of the aperture of the diaphragm 9b in response to a focal length varying operation of the projection lens 9. According to the offset quantity and offset direction of the optical axis of the projection lens 9 relative to the optical axis L0 of the illuminating optical system, the position of the aperture of the diaphragm 9b relative to the optical axis of the projection lens 9 is adjusted. A proper known structure may be adopted to vary the position of the diaphragm 9b.

In this way, according to the second embodiment, the position of the aperture of the diaphragm 9b is variable relative to the optical axis of the projection lens 9. When the optical axis of the projection lens 9 is offset from the optical axis L0 of the illuminating optical system, the aperture of the diaphragm 9b can be adjusted to the optical path of a modulated beam. According to the second embodiment, the shape of the aperture of the diaphragm 9b is rectangular similar to the shape of a display face of the LC light valve 8.

Since the aperture of the diaphragm 9b agrees with the optical path of a modulated beam from the LC light valve 8, the second embodiment can prevent an excessive opening from being formed around a light source image formed at the pupil of the projection lens 9. As a result, no unwanted light passes through the projection lens 9 to deteriorate displayed images.

Third Embodiment

FIGS. 5 and 6 are plan views showing an image display apparatus according to a third embodiment of the present invention, in which FIG. 5 shows a focal-length-variable projection lens 9 being at a short focus end (wide end) and FIG. 6 shows the same at a long focus end (tele end).

According to the third embodiment, the projection lens 9 of the image display apparatus is a focal-length-variable lens (zoom lens). Varying a focal length is achieved by changing the distance between an entrance lens 9a and an exit lens 9c of the projection lens 9. The projection lens 9 consisting of the entrance lens 9a and exit lens 9c has a resultant focal length that is variable according to the distance between the entrance lens 9a and the exit lens 9c.

When the distance between the entrance lens 9a and the exit lens 9c is changed to change a resultant focal length, a pupil position also changes in the direction of an optical axis L0. To prevent the pupil position from moving in response to a focal length change or to compensate for a movement of the pupil position, the projection lens must have many lenses that must be moved in predetermined directions for predetermined distances. Namely, fixing the pupil position requires a complicated lens structure and a movement controlling mechanism, and therefore, increases the size of the projection lens.

To avoid this problem, the third embodiment of the present invention conducts no correction on a pupil position movement caused by a focal length change.

Instead, the third embodiment employs a position/area varying mechanism 92 to change the position of the diaphragm 9b in the direction of the optical axis L0 in response to a pupil position movement caused by a focal length change. Namely, if the pupil position is changed due to a focal length change in the projection lens 9, the third embodiment adjusts the position of the diaphragm 9b to the pupil position.

In the projection lens 9 according to the third embodiment, the pupil position and the position of the diaphragm 9b always agree with each other, to prevent an excessive opening from being formed around a light source image formed by the illumination optical system at the pupil position of the projection lens 9. This prevents unwanted light from passing through the excessive opening to reach a screen 10 and deteriorate images to be displayed on the screen 10.

According to the third embodiment, the shape of an aperture of the diaphragm 9b is rectangular similar to the shape of a display face of an LC light valve 8.

The projection lens 9 is a focal-length-variable lens with the distance between the entrance lens 9a and the exit lens 9c being changed to change a resultant focal length. At this time, the size of a light source image formed at the pupil position changes. In addition, the focal length change varies an F-number.

To prevent the F-number from changing due to a focal length change, the projection lens must have many lenses that must be moved in predetermined directions for predetermined distances. Namely, maintaining an F-number requires a complicated lens structure and a movement controlling mechanism, and therefore, increases the size of the projection lens.

To avoid this problem, the third embodiment of the present invention conducts no correction on an F-number change caused by a focal length change.

Instead, the third embodiment employs the position/area varying mechanism 92 to change the size of the aperture of the diaphragm 9b in response to an F-number change, i.e., a change caused by a focal length change in the size of a light source image formed at the pupil position of the projection lens 9. Namely, the projection lens 9 of the third embodiment can adjust the size of the aperture of the diaphragm 9b to the size of a light source image formed at the pupil position when an F-number is changed due to a focal length change.

Fourth Embodiment

According to the first to third embodiments mentioned above, the LC light valve 8 is a transmission LC display element and the image display apparatus is a monochromatic image display apparatus for the sake of simplicity, although the image display apparatus will be a color image display apparatus in practice. An image display apparatus according to a fourth embodiment of the present invention shown in FIG. 7 is a color image display apparatus that employs reflective LC display elements to display color images.

Figure 7:
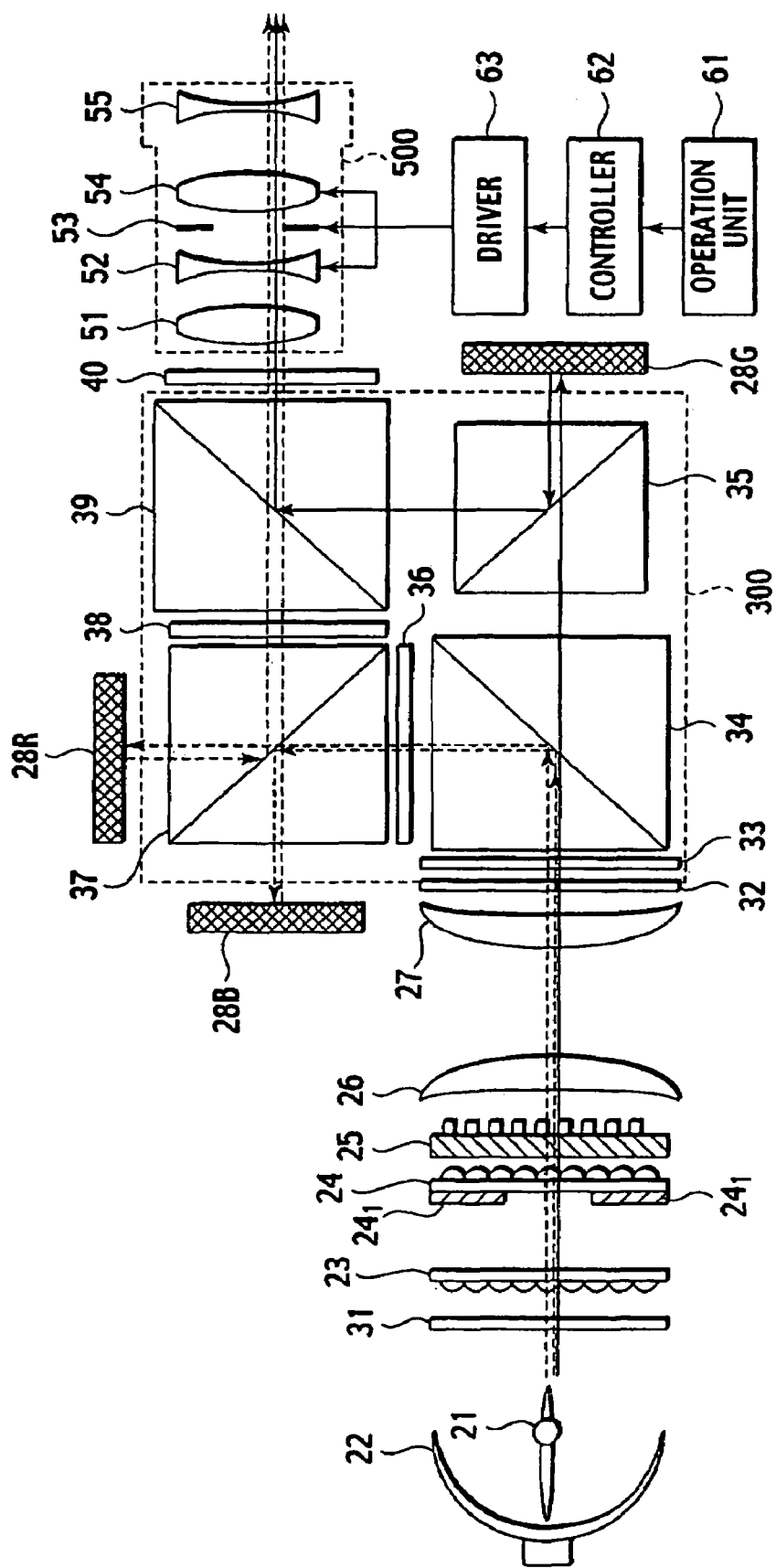
FIG. 7 is a plan view showing an image display apparatus according to a fourth embodiment of the present invention.

In FIG. 7, a light source 21 emits white light, which is reflected by a reflector 22. The reflector 22 provides parallel light flux, which is passed through an infrared/ultraviolet cut filter 31 to block infrared and ultraviolet light that is not necessary for displaying images. Blocking the infrared and ultraviolet light prevents subsequent optical systems from being heated by the light. The light transmitted through the filter 31 is condensed by each cell of first and second lens arrays 23 and 24, like the first to third embodiments.

The light emitted from the second lens array 24 is made incident to a PS combiner 25 and is polarized into s-polarized light or p-polarized light to improve the light use efficiency of subsequent polarizing optical systems. A superposing lens 26 superposes light beams from the lens cells so that the lens cell images of the first and second lens arrays 23 and 24 are superposed on display faces of LC light valves 28R, 28G, and 28B. A condenser lens 27 condenses the light from the superposing lens 26 and supplies the condensed light to subsequent optical systems.

A wavelength selective filter (color balance adjusting filter) 241 is arranged on a face of the second lens array 24 where no lens cells are formed, i.e., the face of the second lens array 24 on the first lens array 23 side, to adjust a color balance (white balance). The filter 241 is preferably a filter to block green (G) and blue (B) light and transmit red (R) light. The filter 241 may be separated from the second lens array 24. It is preferable, however, to deposit the filter 241 on the second lens array 24 so that they may be integrated into one.

According to the first to third embodiments, the lens-cells-formed faces of the first and second lens arrays 3 and 4 are faced to each other. According to the fourth embodiment, the lens-cells-formed faces of the first and second lens arrays 23 and 24 are faced back to back. The orientation of the two lens arrays 23 and 24, however, is optional. For example, the lens-cells-formed faces of the two lens arrays 23 and 24 may be oriented toward a light incoming direction or toward a light outgoing direction.

Figure 8A:
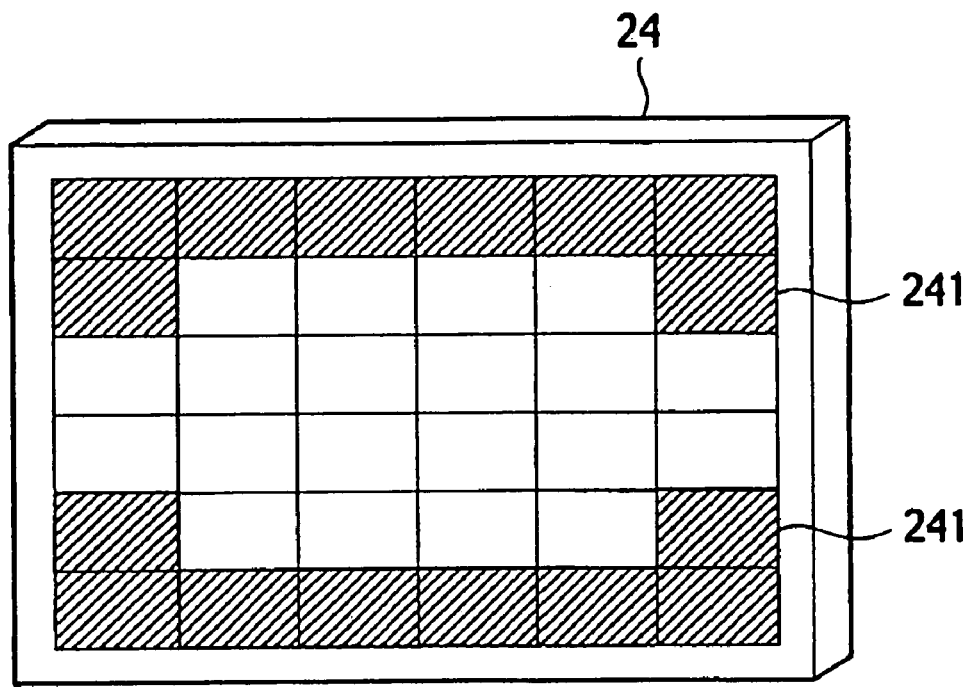
FIGS. 8A and 8B are plan views showing examples of a second lens array 24 shown in FIG. 7.
Figure 8B:
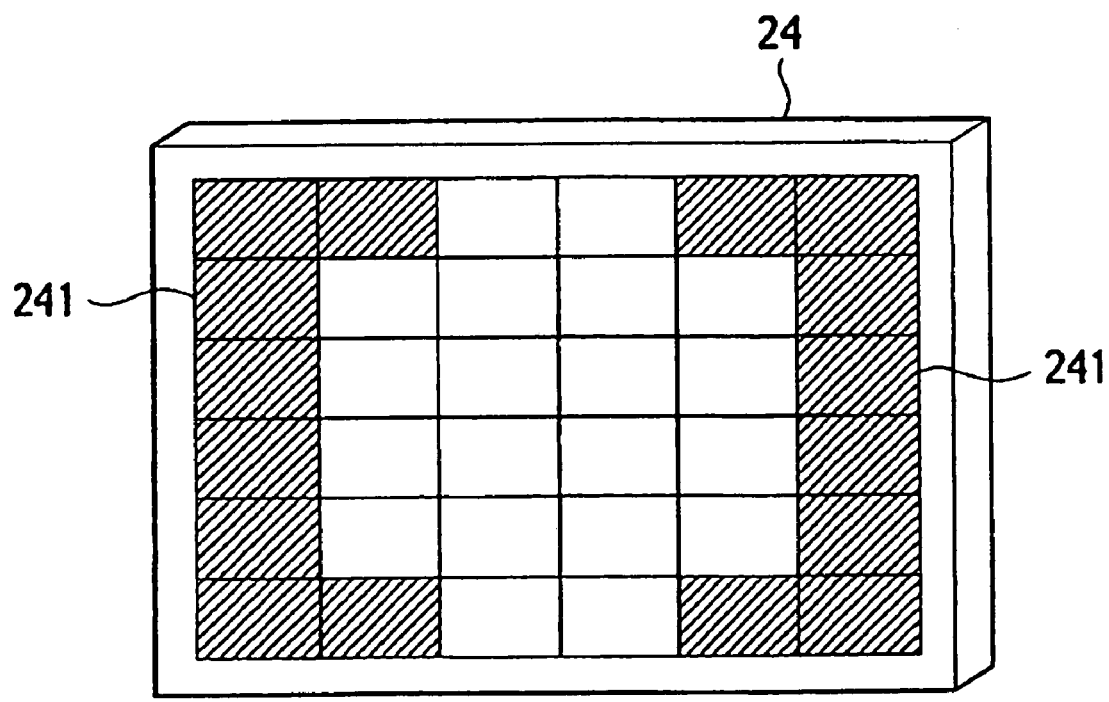

The second lens array 24 having the filter 241 will be explained in detail with reference to FIGS. 8A and 8B in which FIG. 8A shows a first exemplary arrangement of the filter 241 and FIG. 8B a second exemplary arrangement thereof. In FIGS. 8A and 8B, a face of the second lens array 24 where no lens cells are formed is divided into a plurality of sections. The filter 241 is deposited to cover peripheral ones of the sections. It is preferable that the size of each section corresponds to the size of a lens cell.

In FIG. 8A, left and right peripheral sections are not covered with the filter 241. In FIG. 8B, top and bottom peripheral sections are not covered with the filter 241. Whether the left and right peripheral sections or the top and bottom peripheral sections are selected to be without the filter 241 is dependent on the characteristics of polarizing beam splitters to be explained later or ¼ wavelength plates (not shown in FIG. 7) of the image display apparatus. In any case, the filter 241 is arranged to properly adjust a color balance and improve contrast.

Returning to FIG. 7, the light emitted from the condenser lens 27 is made incident to a polarizer 32, which transmits only a specific polarized component. A wavelength selective phase plate 33 modulates only light having a specific wavelength and supplies the modulated light to a polarizing beam splitter (PBS) 34. A green (G) beam indicated with a solid line is transmitted through a joint face of the PBS 34 and through a joint face of a PBS 35 and is made incident to the green-beam LC light valve 28G, which modulates the beam and returns the modulated beam. The modulated green beam is reflected by the joint face of the PBS 35 and is made incident to a PBS 39.

A red beam indicated with a dot-and-dash line and a blue beam indicated with a dotted line are reflected by the joint face of the PBS 34, are transmitted through a wavelength selective phase plate 36, and are made incident to a PBS 37. Among the red and blue beams, the red beam is transmitted through a joint face of the PBS 37 and is made incident to the red-beam LC light valve 28R, which modulates the beam and returns the modulated beam. The modulated red beam is reflected by the joint face of the PBS 37, is transmitted through a wavelength selective phase plate 38, and is made incident to the PBS 39.

The blue beam is reflected by the joint face of the PBS 37 and is made incident to the blue-beam LC light valve 28B, which modulates the beam and returns the modulated beam. The modulated blue beam is transmitted through the joint face of the PBS 37, is transmitted through the wavelength selective phase plate 38, and is made incident to the PBS 39. The green beam made incident to the PBS 39 is reflected by a joint face of the PBS 39 and the red and blue beams made incident to the PBS 39 are transmitted through the joint face of the PBS 39, so that the red, green, and blue beams are combined into a combined beam. The combined beam from the PBS 39 is made incident to an analyzer 40, which transmits a specific polarized component to a projection lens 500. The wavelength selective phase plates 33, 36, and 38 and the PBSs 34, 35, 37, and 39 encircled with a dotted line form a color separating/combining optical system 300.

The structure and operation of the projection lens 500 will be explained in detail. In FIG. 7, the projection lens 500 consists of convex lenses (hereinafter referred to simply as lenses) 51 and 54 and concave lenses (hereinafter referred to simply as lenses) 52 and 55. Between the lenses 52 and 54, there is a diaphragm 53. The number of lenses is not limited to that shown in FIG. 7 and is optionally selectable. The location of the diaphragm 5, is not limited to that shown in FIG. 7.

In FIG. 7, the center axis of the projection lens 500 is upwardly offset from the optical axis of the LC light valve 28B, PBS 39, and analyzer 40, to provide a flapping function.

The lenses 52 and 54 in the projection lens 500 are moved in an optical axis direction according to a focal length varying (zooming) operation. Also, the diaphragm 53 is moved in an optical axis direction according to the focal length varying operation. A focal length varying operation is conducted through an operation unit 61, which is installed on the image display apparatus or is a remote-control transmitter. An instruction signal for a focal length varying operation from the operation unit 61 is supplied to a controller 62, which is a microcomputer, for example. According to the instruction signal, the controller 62 controls a driver 63 to move the lenses 52 and 54 and diaphragm 53 along the optical axis. The driver 63 is provided with a motor, which drives a cam follower along a cam formed oil a barrel of the projection lens 500, to thereby move the lenses 52 and 54 and diaphragm 53 along the optical axis. It is naturally possible to employ no motor and manually move the lenses 52 and 54 and diaphragm 53.

Figure 9A:
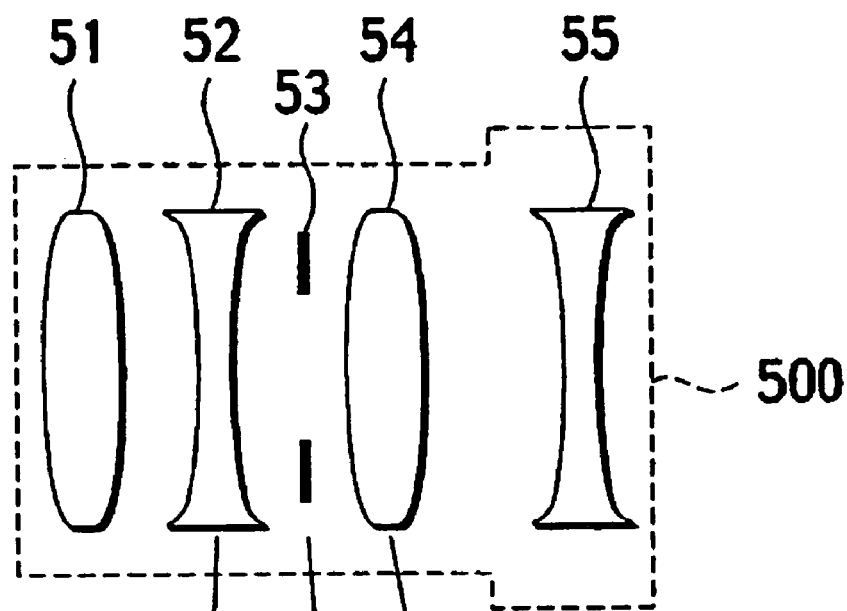
FIGS. 9A and 9B are plan views showing a projection lens 500 shown in FIG. 7 at short and long focus ends, respectively.
Figure 9B:
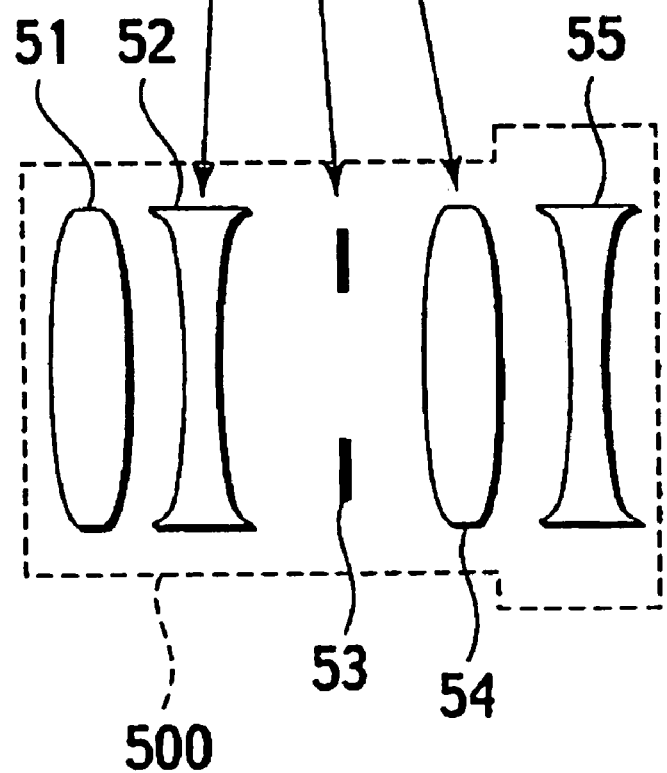

FIG. 9A shows the positions of the lenses 52 and 54 and diaphragm 53 when the projection lens 500 is moved to a short focus end (wide end), and FIG. 9B shows the positions thereof when the projection lens 500 is moved to a long focus end (tele end). When a focal length varying operation is conducted to move the projection lens 500 from the wide end to the tele end, the lens 52 moves toward the lens 51 and the diaphragm 53 and lens 54 toward the lens 55. The moving distance of the diaphragm 53 differs from that of the lens 54.

Figure 10A:
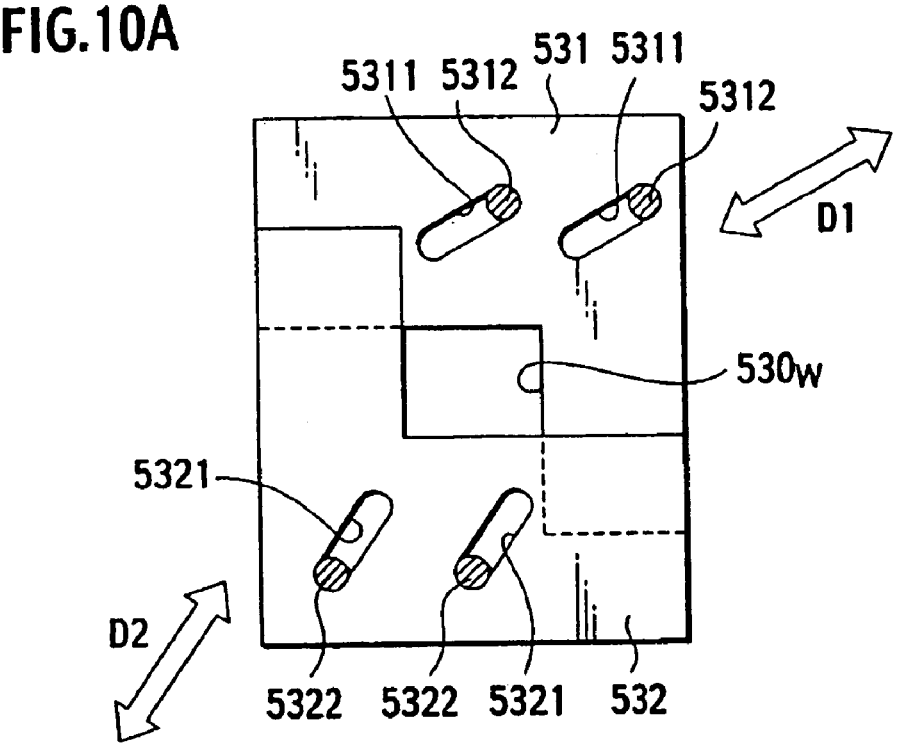
FIGS. 10A and 10B are plan views showing a diaphragm 53 shown in FIG. 7 at short and long focus ends, respectively.
Figure 10B:
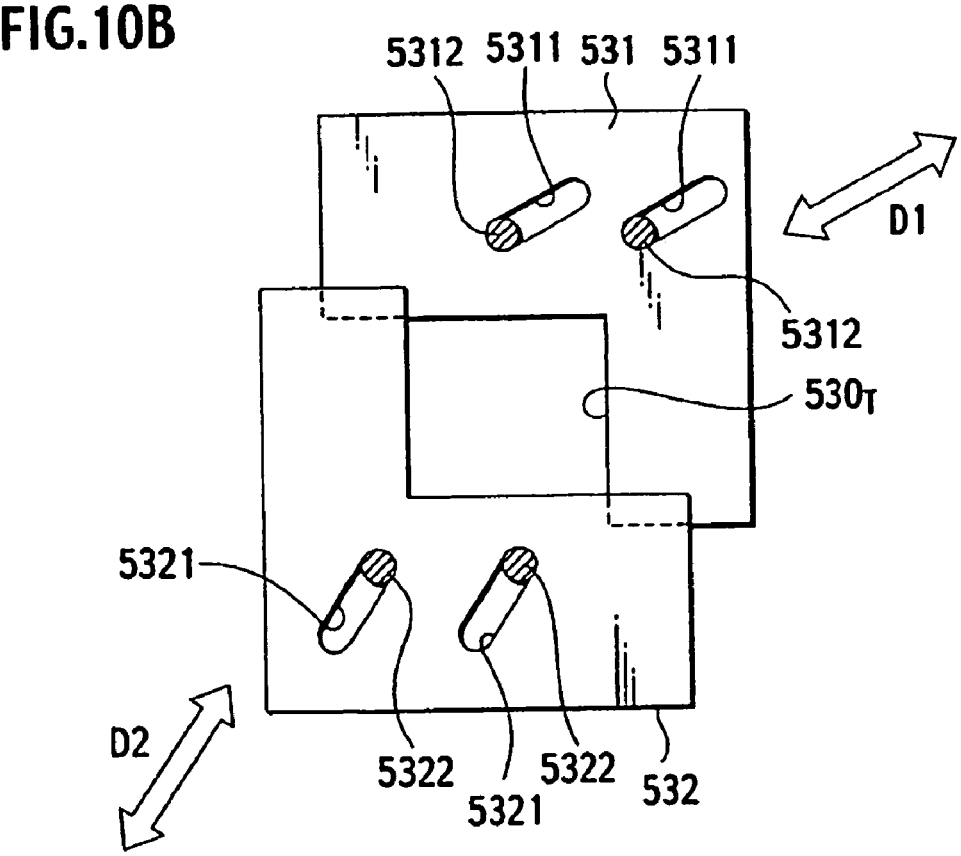

According to the fourth embodiment, the diaphragm 53 changes its axial position as well as its aperture area according to a focal length varying operation. This will be explained with reference to FIGS. 10A to 13. In FIGS. 10A and 10B, the diaphragm 53 consists of, for example, two L-shaped plates 531 and 532. The L-shaped plate 531 is provided with two parallel cams 5311, and the L-shaped plate 532 is provided with two parallel cams 5321. The cams 5311 engage with pin-like cam followers 5312, respectively. The cams 5321 engage with pin-like cam followers 5322, respectively.

The cam followers 5312 and 5322 are moved along the cams 5311 and 5321, to bring the L-shaped plates 531 and 532 close to or away from each other. The L-shaped plate 531 moves in the direction of an arrow mark D1, and the L-shaped plate 532 in the direction of an arrow mark D2. The cams 5311 are not in parallel with the cams 5321, and therefore, the arrow marks D1 and D2 are not in parallel with each other.

FIG. 10A shows a state of the diaphragm 53 when the projection lens 500 is at the short focus end (wide end), and FIG. 10B shows a state of the diaphragm 53 when the projection lens 500 is at the long focus end (tele end). In FIG. 10A, the L-shaped plates 531 and 532 form a rectangular aperture 530W, and in FIG. 10B, they form a rectangular aperture 530T. The L-shaped plates 531 and 532 can form a rectangular aperture 530 of any size. The aperture 530W has the smallest area, and the aperture 530T has the largest area.

Figure 11A:
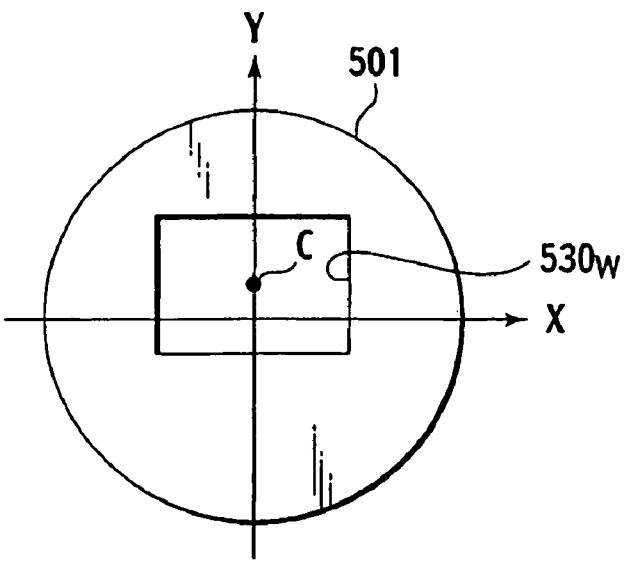
FIGS. 11A, 11B, and 11C are views showing different states of an aperture of the diaphragm 53 adjusted according to different focal lengths.
Figure 11B:
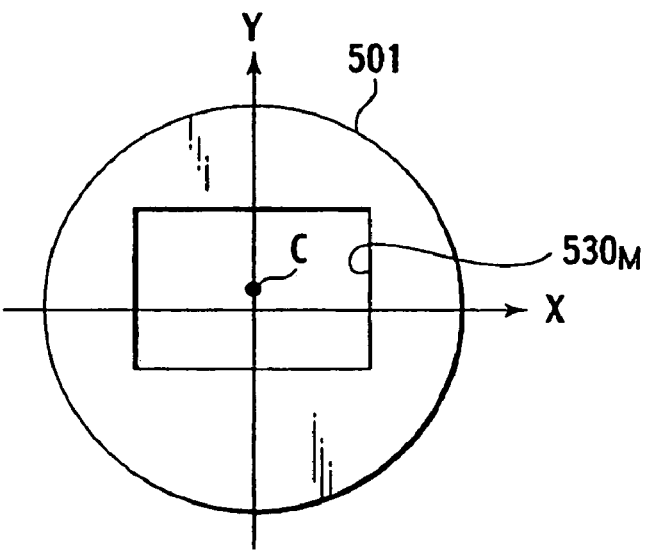
Figure 11C:
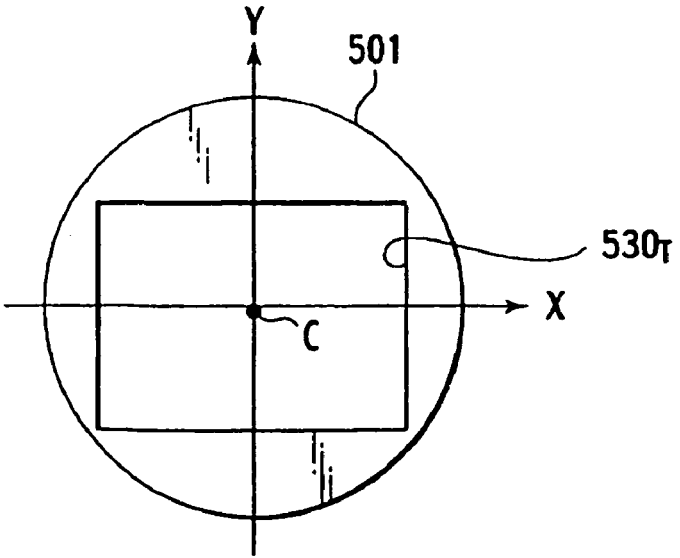

FIGS. 11A to 11C are views of the projection lens 500 seen from an optical axis direction and show changes in the position and size of the aperture 530 relative to the barrel 501 of the projection lens 500 according to focal length varying operation. In FIG. 11A, the projection lens 500 is at the short focus end (wide end). In FIG. 11C, the projection lens 500 is at the long focus end (tele end). In FIG. 11B, the projection lens is at a middle point between the short focus end and the long focus end.

In FIG. 11A, the center C of the aperture 530W is higher than the intersection of a horizontal axis X and a vertical axis Y. In FIG. 11B, the aperture 530M is greater than the aperture 530W and the center C of the aperture 530M is closer to the intersection than in FIG. 11A. In FIG. 11C, the center C of the aperture 530T is slightly lower than the intersection.

Figure 12:
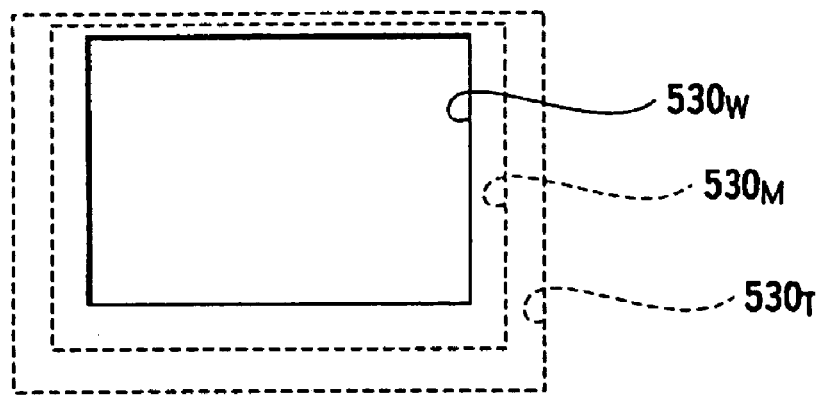
FIG. 12 is an overlapped view showing the different states shown in FIGS. 11A to 11C of the aperture of the diaphragm 53.

FIG. 12 shows the apertures 530W, 530M, and 530T overlapped one another. As is apparent from FIG. 12, the aperture 530 substantially symmetrically expands in the horizontal (left-right) direction from the short focus end to the long focus end. In the vertical (top-bottom) direction, however, it asymmetrically expands. Namely, it more expands in a bottom direction than in a top direction. This is because the projection lens 500 is upwardly offset to realize the flapping function. The apertures 530W, 530M, and 530T are similar to one another and have different areas.

Figure 13:
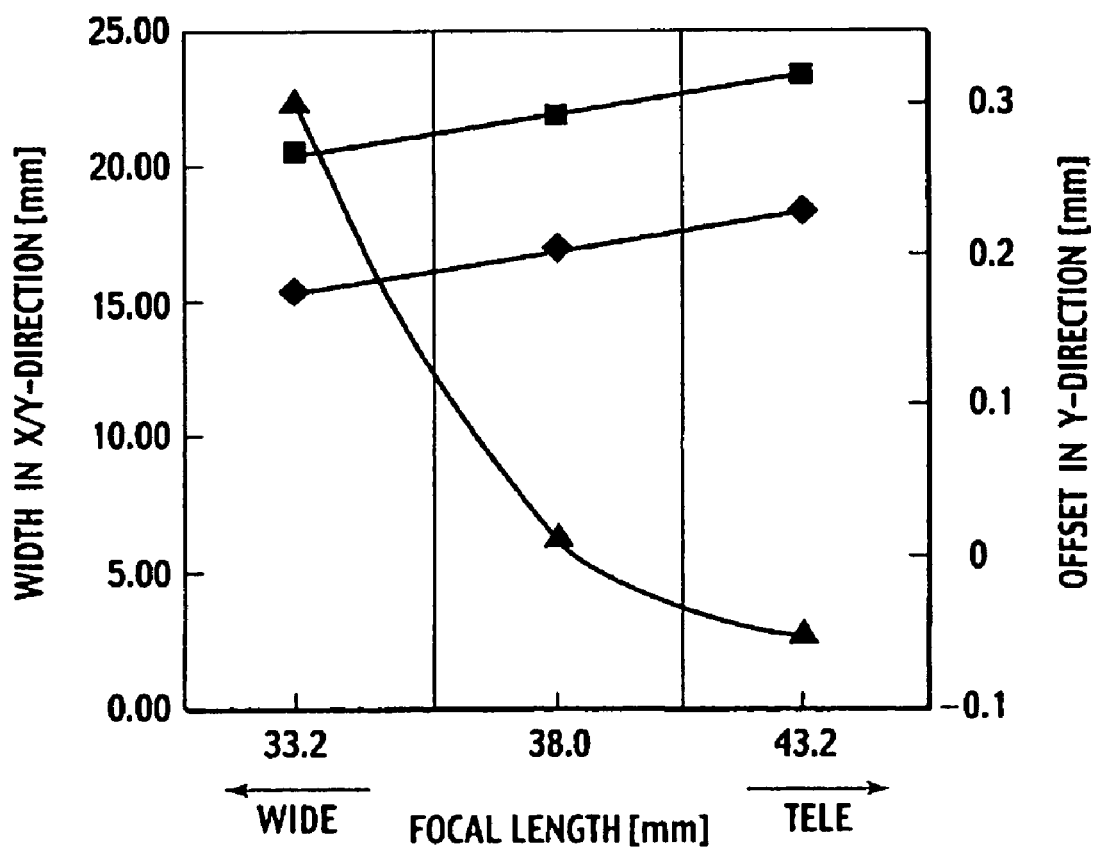
FIG. 13 is a graph showing changes in the area and position of the aperture of the diaphragm 53 relative to focal length changes, the position of the aperture being measured from an optical axis.

FIG. 13 is a graph showing changes in the focal length of the projection lens 500 and changes in the horizontal (X) width, vertical (Y) width, and Y-direction offset of the center C of the aperture 530. Values shown in FIG. 13 for the focal lengths and the X- and Y-widths and Y-offset of the aperture 530 are only examples and differ depending on the design of the image display apparatus.

In FIG. 13, the X- and Y-widths of the aperture 530 substantially linearly increase from the short focus end to the long focus end. On the other hand, the Y-offset of the center C of the aperture 530 changes along a curve, is highest at the short focus end, agrees with the intersection of horizontal (X) axis and vertical (Y) axis on the way, and is lowest at the short focus end.

According to the fourth embodiment, the shape of the aperture of the diaphragm 53 is similar to a predetermined shape (for example, rectangular) of a beam condensed by the illuminating optical system, to block unwanted light. Accordingly, the fourth embodiment can project high-contrast images on a screen without deteriorating the quality of the images. The fourth embodiment optimally controls the area of the aperture 530 of the diaphragm 53 according to a focal length varying operation, so that the quality of displayed images will not be deteriorated and no necessary light is blocked to drop the light use efficiency.

When the projection lens 500 is offset from an optical axis to achieve a flapping function, the fourth embodiment always optimally controls the position (relative to the optical axis) of the aperture 530 of the diaphragm 53 in a flapping direction according to a focal length varying operation. Accordingly, the filter 241 on the second lens array 24 can optimally adjust a color balance and the optimum color balance is maintained to the end.

That which is claimed:

1. An image display apparatus having a focal-length-variable projection lens, comprising:
  light sources configured to emit three primary color beams;
  spatial light modulators arranged for the three of color beams, respectively, each of the spatial light modulators being configured to modulate the corresponding color beam;
  a color combining optical system configured to combine the modulated color beams from the spatial light modulators into a combined beam and supply the combined beam to the projection lens;
  a diaphragm having an aperture of a predetermined shape; and
  a first position-varying mechanism configured to vary the position of the diaphragm in an optical axis direction in response to a focal length varying operation of the projection lens.

2. The image display apparatus of claim 1, further comprising:
  an area varying mechanism configured to vary the area of the aperture of the diaphragm in response to the focal length varying operation of the projection lens.

3. The image display apparatus of claim 1, wherein the projection lens is offset from an optical axis and the image display apparatus further comprises a second position-varying mechanism configured to vary the position of the aperture of the diaphragm relative to the optical axis in response to the focal length varying operation of the projection lens.

4. The image display apparatus of claim 1, wherein the projection lens includes a plurality of lenses and the diaphragm is arranged between two of the plurality of lenses.

* * * * *